United States Patent

Kahkoska et al.

[11] Patent Number: 6,002,671
[45] Date of Patent: Dec. 14, 1999

[54] TEST INSTRUMENT FOR TESTING ASYMMETRIC DIGITAL SUBSCRIBER LINES

[75] Inventors: James Kahkoska; Bruce James Kosbab, both of Colorado Springs, Colo.

[73] Assignee: Fluke Corporation, Everett, Wash.

[21] Appl. No.: 08/922,415

[22] Filed: Sep. 3, 1997

[51] Int. Cl.[6] .......................... G01R 31/08; G08G 15/00; H04M 1/24
[52] U.S. Cl. .......................... 370/248; 379/27; 371/20.4; 348/192
[58] Field of Search .................................. 370/245, 248, 370/249, 503; 379/93.01, 93.08, 93.26; 348/6; 395/200.63

[56] References Cited

U.S. PATENT DOCUMENTS

| | | | |
|---|---|---|---|
| 5,644,573 | 7/1997 | Bingham et al. | 370/503 |
| 5,812,786 | 9/1998 | Seazholtz et al. | 395/200.63 |
| 5,847,749 | 12/1998 | Proctor et al. | 348/6 |

Primary Examiner—Hassan Kizou
Assistant Examiner—John Pezzlo
Attorney, Agent, or Firm—Douglas J. Barker; George T. Noe

[57] ABSTRACT

A method of testing ADSL (asymmetric digital subscriber line) circuits is provided. A test instrument is connected to the customer premises end of the ADSL circuit, consisting of an ATU-C modem on the central office end and an ATU-R modem on the customer premises end, with a twisted-pair telephone line connecting the ATU-R and ATU-C modems. A remote test instrument is coupled to the ATU-C modem, typically on a semi-permanent basis in the central office, dedicated for testing multiple ADSL circuits by communicating with multiple ATU-C modems via a switch or router. The test instrument and remote test instrument communicate with each other in full duplex via the ADSL circuit using Internet Protocol (IP) data packets. The test instrument generates the upstream data traffic, controls the test sequence, and controls and coordinates the throughput test with the remote test instrument. The remote test instrument sends the downstream data traffic and returns the results of the throughput test in the form of frame counts from its end of the ADSL circuit back to the test instrument at end of the test sequence. The results from the upstream and downstream throughput tests are then visually displayed to the user of the test instrument.

6 Claims, 5 Drawing Sheets

TEST INSTRUMENT FOR TESTING ASYMMETRIC DIGITAL SUBSCRIBER LINES

BACKGROUND OF THE INVENTION

This invention relates generally to test instruments for testing communication networks and in particular to a test instrument and method for testing asymmetric digital subscriber lines (ADSL).

ADSL is a new modem technology which converts existing twisted-pair telephone lines into access lines for high speed digital communication and multimedia services such as video on demand (VOD). ADSL operates according to a frequency division multiplex (FDM) scheme in which the frequency spectrum between 0 and 4 kiloHertz (kHz) is allocated for POTS (plain old telephone service) and between 4 kHz and 1.1 MegaHertz (MHz) is allocated for data. In this way, the huge installed base of twisted pair copper wire telephone lines may be used to carry both voice and data traffic. By separating the voice and data paths, the telephone switching system is freed up for conventional voice traffic while the data traffic is moved to digital networks, at data rates 50 times higher than the conventional analog modems over POTS circuits. The POTS circuit is uninterrupted even if the data portion of the ADSL circuit fails.

ADSL is defined according to the American National Standards Institute (ANSI) as ANSI Standard T1.413. An ADSL circuit consists of an ADSL modem on each end of the twisted-pair telephone line. At the telephone company central office, the modem is commonly called the ATU-C (ADSL transmission unit—central) while the modem on the customer premise side is the ATU-R (ADSL transmission unit—remote). ADSL provides data rates up to 8 Megabits per second (Mbps) from the central office to the customer (downstream) while providing upstream data rates from the customer premises up to 640 kbps. This asymmetric relationship between downstream and upstream data rates matches the original intent of ADSL to provide high bandwidth multimedia services downstream with more limited bandwidth requirements upstream from the customer premises.

Twisted-pair telephone lines that will be used for ADSL were designed for low frequency analog voice service, commonly known as POTS. For an installed base of telephone lines, there will be substantial variations in the distance from the customer premises to the central office, the diameter of the copper wires, as well as the number of bridge taps and load coils along each telephone line. ADSL commonly employs Discrete Multitone (DMT) line coding which allows the ATU-R and ATU-C modems to dynamically adapt to the line conditions to obtain the maximum throughput through the ADSL circuit. In addition, ADSL modems may employ forward error correction, trellis encoding, echo cancellation, and other techniques to obtain lower error rate communications, particularly for error sensitive applications such as video transmission. Because of its ability to dynamically adapt to the line conditions of the twisted-pair line, an ADSL circuit must be fully evaluated using traffic generation both upstream and downstream to stress the ADSL circuit to obtain throughput measurements as an overall measure of its performance.

Several types of test instruments exist that may be used in ADSL testing, including line qualification testers and personal computers running test software. Line qualification testers are analog instruments that test the physical condition of the twisted pair line, typically providing such time domain reflectometer (TDR) information as well as attenuation versus frequency and d.c. resistance. However, unless there is a problem with the twisted-pair line that prevents the ADSL circuit from operating properly, the installer of the ADSL circuit cares only about the maximum available throughput through the working ADSL circuit, in units of bits per second (bps), that can be obtained which may be compared against a level of service guaranteed to the customer.

In a conventional digital circuit, the upstream and downstream data rates are the same, allowing a digital loopback test to be performed in which traffic is echoed back from the far end of the digital circuit. However, in an ADSL circuit, the upstream and downstream data rates are different, making the digital loopback test unusable. Furthermore, conventional personal computers having a network interface card (NIC) typically lack the ability to generate traffic at a sufficient number of packets per second to create the level of stress required for this throughput measurement, creating the need for specialized traffic generator circuits capable of generating large amounts of packets per second.

The upstream and downstream data paths in the ADSL circuit, although operating according to the frequency division multiplexing scheme, may interact and interfere with each other to reduce the maximum available throughput. The throughput of the ADSL circuit therefore must be measured with traffic generated in both the upstream and downstream paths simultaneously in order to stress the ADSL circuit, therefore requiring two test instruments that are working on each end of the ADSL circuit in tandem.

Therefore, it would be desirable to provide a test instrument capable of testing an ADSL circuit, operating in tandem with a remote test instrument at the opposite end of the ADSL circuit, to provide a measurement of the throughput of the ADSL circuit.

SUMMARY OF THE INVENTION

In accordance with the present invention, a test instrument for testing ADSL circuits is provided. An ADSL circuit consists of an ATU-C modem at the central office end and an ATU-R modem at the customer premises end, with a twisted-pair telephone line connecting the ATU-R and ATU-C modems. The test instrument is connected to the customer premises end of the ADSL circuit. A remote test instrument is coupled to the ATU-C modem, typically on a semi-permanent basis in the central office, dedicated for testing multiple ADSL circuits by communicating with multiple ATU-C modems via a switch or router.

The test instrument and remote test instrument communicate with each other via the ADSL circuit using Internet Protocol (IP) data packets. In the preferred embodiment, the test instrument and ATU-R modem communicate via an Ethernet interface and the remote test instrument and ATU-C modem also communicate via an Ethernet interface. The test instrument and remote test instrument may vary only in their selected roles as test instrument and remote test instrument, with the choice of role depending on which end of the ADSL circuit the respective test instruments are connected. The test instrument generates the upstream data traffic, controls the test sequence, and controls and coordinates the throughput test with the remote test instrument. The remote test instrument sends the downstream data traffic and returns the results of the throughput test in the form of frame counts from its end of the ADSL circuit back to the test instrument at end of the test sequence. The results from the upstream and downstream throughput tests are then visually displayed to the user of the test instrument.

In addition to throughput, the test instrument according to the preferred embodiment may also have the ability to measure connectivity, meaning the ability to communicate with network devices on the central office side of the ADSL circuit, such as a switch or router that is coupled to the Internet or Wide Area Network (WAN). Connectivity may be established using the ICMP (Internet Control Message Protocol) PING, either singly or in a series of PINGs over time to establish the reliability of the connection from the test instrument to the network device. For each PING, the targeted network device is requested to reply. The remote test instrument can be PINGed in this manner to test the connectivity of the ADSL link.

The test instrument according to the preferred embodiment may also have the ability to measure latency, meaning the time lag associated with data as it travels through the LAN. Latency may be measured by synchronizing the clocks between the test instrument and remote test instrument, sending data packets, and measuring the time difference between the sent and arriving packets. A series of latency measurements may be conducted over a period of time in order to measure latency jitter, which is the variability of latency over time.

One object of the present invention is to provide a test instrument for testing an ADSL circuit.

Another object of the present invention is to provide a test instrument which, in combination with a remote test instrument, provides for testing the maximum throughput of an ADSL circuit.

A further object of the present invention is to provide a method for testing the throughput of an ADSL circuit by simultaneously generating data traffic in both directions through the ADSL circuit at different data rates.

An additional object of the present invention is to provide a method for testing an ADSL circuit coupling a test instrument and a remote test instrument to opposite ends of the ADSL circuit which simultaneously generate data traffic in both directions through the ADSL circuit.

Other features, attainments, and advantages will become apparent to those skilled in the art upon a reading of the following description when taken in conjunction with the accompanying drawings.

DETAILED DESCRIPTION OF THE INVENTION

Figure 1:
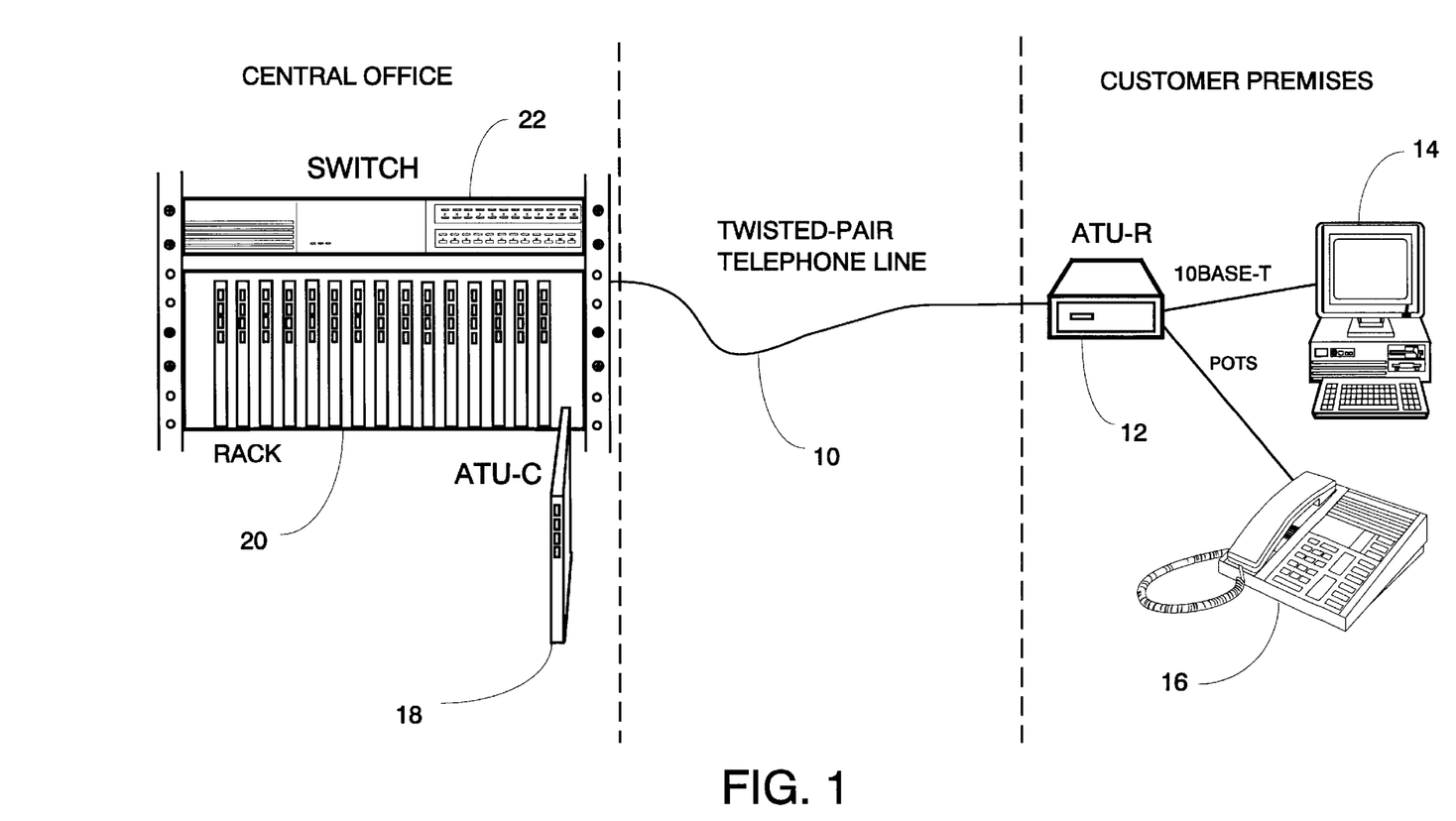
FIG. 1 is an illustration (not to scale) of a typical installation of an ADSL circuit.

FIG. 1 is a simplified drawing of a typical installation of an ADSL circuit from a central office of a telephone company to a customer premises using a twisted-pair telephone line 10. Because twisted-pair telephone lines vary greatly by length, diameter of the copper wires, and the number of bridge taps and loading coils, among other factors, the throughput of ADSL circuits will vary widely. An ATU-R (ADSL transmission unit—remote) 12 is connected to the customer premises end of the twisted-pair telephone line 10. The ATU-R 12 decodes the ADSL signal to obtain data packets which are sent and received via a 10BASE-T line to a client 14 at the customer premises. 10BASE-T is commonly understood to be twisted-pair Ethernet. Network devices such as switches and hubs (not shown) may be used to connect other clients and servers in the customer premises. Other network and link level protocols, such as 100BASE-T or Token Ring, may be readily substituted for the 10BASE-T line.

The ADSL circuit allows the twisted pair telephone line 10 to be used to handle a POTS circuit for the telephone 16 as well. The POTS circuit does not depend on the proper operation of the data paths of the ADSL circuit.

In the central office, each ADSL circuit terminates in an ATU-C 18, with multiple ATU-Cs 18 typically mounted in a rack 20. The ATU-C 18 decodes the ADSL signal to obtain IP data packets which are sent and received via a 10BASE-T connection and separates off the POTS circuit for connection to the public switched telephone network (not shown). Each of the ATU-Cs 18 is connected to other network devices such as a switch 22 which selectively switches the data packets on to other networks, such as the Internet. During an installation of an ADSL circuit, the twisted-pair telephone line, already installed and operating as a POTS circuit, is terminated with the ATU-R 12 and the ATU-C 18 at opposite ends.

Figure 2:
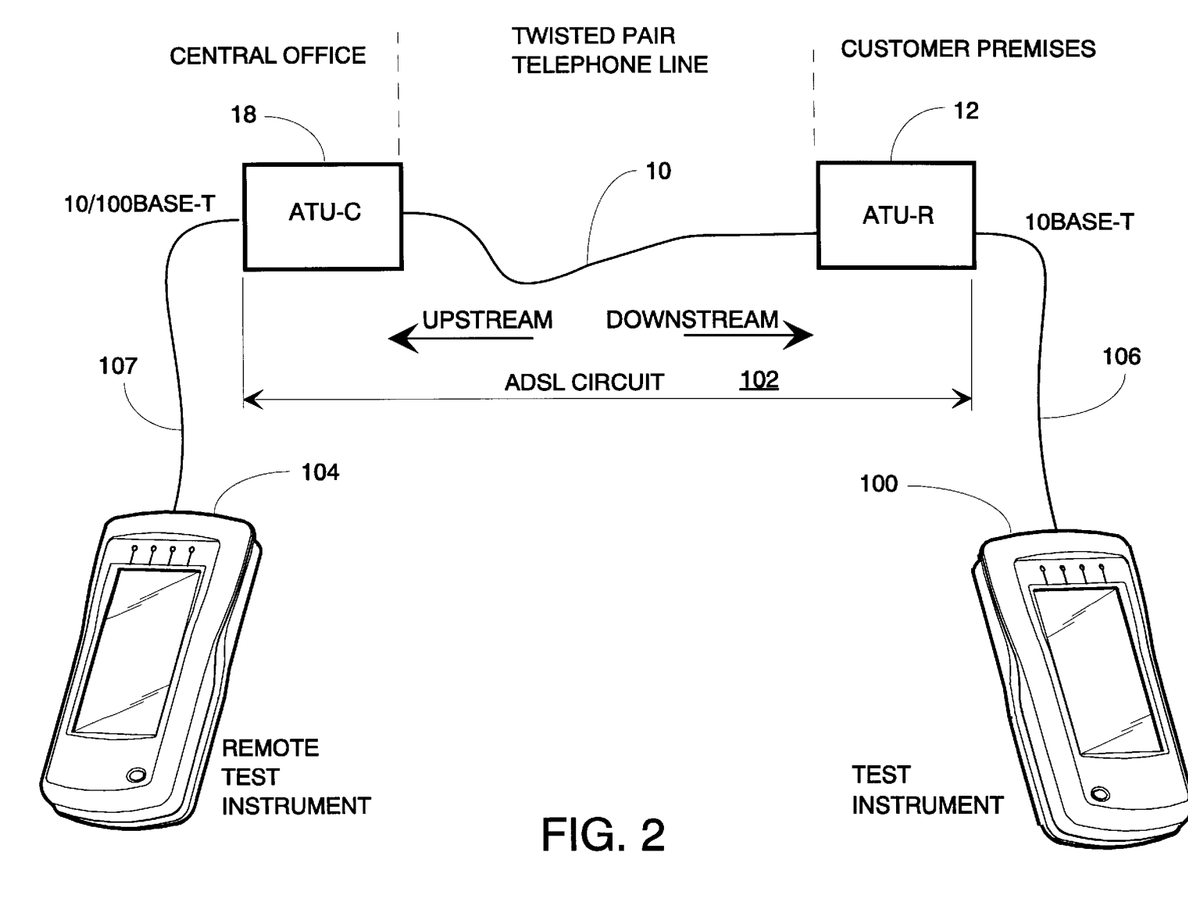
FIG. 2 is a simplified drawing (not to scale) of a test instrument and remote test instrument applied in testing the ADSL circuit shown in FIG. 1.

In FIG. 2, there is shown a simplified schematic drawing of a test instrument 100 operating in conjunction with a remote test instrument 104 to test an ADSL circuit 102 according to the present invention. The test instrument 100 is connected to the ATU-R 12 via a patch cord 106. The ATU-R 12 and the test instrument 100 communicate via standard 10BASE-T Ethernet ports. Similarly, the ATU-C 18 and the remote test instrument 104 communicate via standard 10BASE-T Ethernet ports. It is desirable that the installer or maintainer of the ADSL circuit 102 have the ability to verify the throughput of the ADSL circuit 102 as well its connectivity to selected network devices in the central office, such as the switch 22. Throughput is a measure of the overall performance of the ADSL circuit 102, under predetermined levels of data traffic and according to the conditions of the twisted-pair telephone line 10.

The ADSL circuit 102 provides data paths in two directions—"upstream" from the customer premises to the central office, and "downstream" from the central office to the customer premises. The upstream and downstream paths interact with each other to some extent, making it desirable to test throughput by sending data traffic in both directions simultaneously to appropriately stress the ADSL circuit 102. Because the upstream and downstream paths are not at the same data rate, a digital loopback test will not work. Rather, the test instrument 100 and the remote test instrument 104 must work in tandem to generate the assymetrical upstream and downstream traffic and evaluate the results according to an automated throughput test as explained in more detail below.

The primary concern of the ADSL circuit installer is in obtaining an acceptable downstream throughput while handling an expected level of upstream traffic, typically consisting of TCP (transmission control protocol) acknowledgments sent in response to the downstream traffic received. The upstream traffic, for the purposes of the throughput test, is thus kept fixed at an expected data rate found according to a reasonable amount of experimentation. The ratio of the downstream data rate to upstream data rates to downstream data has been found to be on the order of 10 to 1 and as high as 20 to 1 in the majority of applications. For downstream data rates ranging from 1.5 to 8 Mbps, an upstream data rate in the range of 60 to 640 kbps may be chosen. It is desirable to use the single upstream data rate in order to obtain a single throughput measurement of the downstream data path for test purposes. A series of upstream data rates may be tested with an attendant increase in test time to obtain more detailed throughput testing.

Figures 3, 3A:
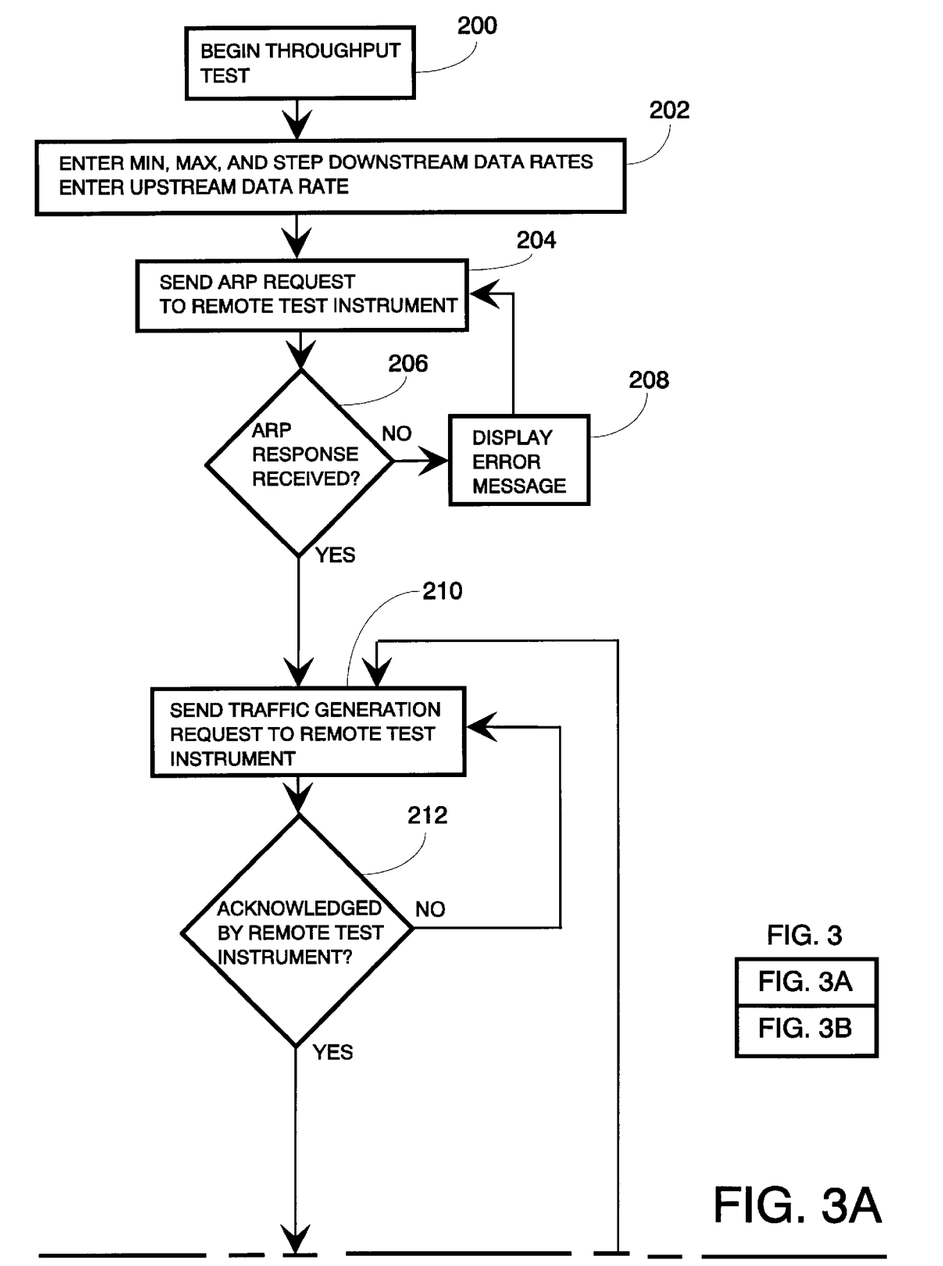
FIGS. 3A and 3B together comprise a flow diagram of the method of testing the ADSL circuit.
Figure 3B:
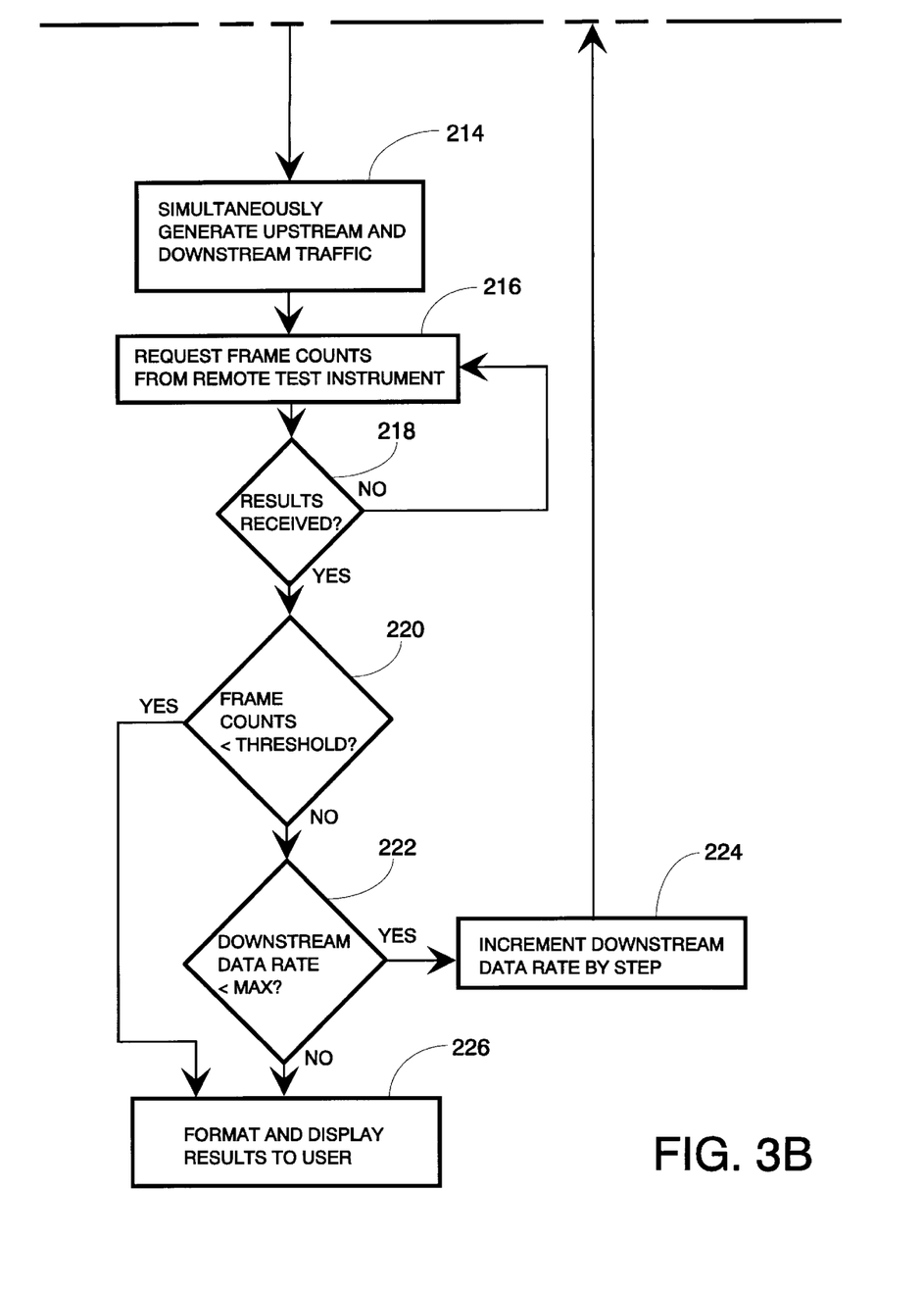

FIGS. 3A–B collectively comprise a flow chart of the method of testing an ADSL network according to the present invention. In summary, the throughput test, begins by accepting the variables MIN (minimum throughput), MAX (maximum throughput), STEP (step size), and upstream data rate from the user. The throughput test first establishes communications between the test instrument and remote test instrument and coordinates the sending of data traffic through the ADSL circuit at selected data rates according to a remote traffic generator protocol. The remote traffic generator protocol is a set of commands and data types that is the basis for sending a traffic generation request.

The test instrument then begins testing throughput, with the data rate of the downstream path starting at the minimum data rate and incrementing the data rate up by the step size. The maximum throughput is the upper limit, typically determined according to the ability of the network devices to handle the network traffic without significant disruption to other network data traffic ("production network friendly"). Below this maximum throughput, the throughput test will stop when the percentage of packets getting through falls below a predetermined minimum threshold, such as 95%, to obtain a maximum available throughput. Upon completion of the throughput test, the results, including the maximum available throughput of the downstream data path, are formatted and displayed to the user.

In FIG. 3A, step 200 labeled BEGIN THROUGHPUT TEST, the test instrument 100 and remote test instrument 104 are connected to both sides of the ADSL circuit 102 (shown in FIG. 2) for testing, such as during a service call or a new installation of the ADSL circuit 102. The test instrument 100 executes an instrument control program to implement the present method and to further control the operation of the remote test instrument 104 via commands sent via the ADSL circuit 102. The test instrument 100 and the remote test instrument 104 may be identical instruments or the remote test instrument 104 may be of reduced configuration with no user interface since the remote test instrument 104 is remotely controlled.

In step 202 labeled DOWNSTREAM—ENTER MIN, MAX, AND STEP DATA RATES, UPSTREAM—ENTER DATA RATE, the user is prompted to enter the variables that determine the data rates that will be tested for the upstream and downstream data paths. In the preferred embodiment, the downstream throughput is determined by testing at different data rates, starting from the lower limit MIN, such as 4 Mbps, incremented by an amount STEP, such as 1 Mbps, and going as high as the upper limit MAX, for example 7 Mbps. The upstream data rate is kept constant at an expected data rate, such as 50 kbps. The method may be readily modified to test any combination of upstream and downstream data rates in order to obtain a measure of throughput according to specific requirements.

In step 204 labeled SEND ARP REQUEST TO REMOTE TEST INSTRUMENT, the test instrument 100 seeks to establish communication with the remote test instrument 104 via an ARP (address resolution protocol) request. The IP address of the remote test instrument 104 must be known so that the ARP request is addressed to it. In the typical scenario, the remote test instrument 104 is located in the central office and its IP address is known by the user.

In step 206 labeled ARP RESPONSE RECEIVED?, the test instrument 100 waits to receive a reply from the remote test instrument 104 to its ARP request. If the ADSL circuit 102 is functioning well enough to provide basic connectivity, this connection should be made. If no reply is received, the test instrument 100 may continue sending the ARP request and generate error messages according to step 208 labeled DISPLAY ERROR MESSAGE or terminate the throughput test because of a communication failure.

In step 210 labeled SEND TRAFFIC GENERATION REQUEST TO REMOTE TEST INSTRUMENT, once communications have been established, the test instrument 100 now controls the operation of the remote test instrument 104 and instructs the remote test instrument 104 to generate traffic through the downstream data channel at a specified data rate according to a remote traffic generator protocol, starting with MIN, and to count the number of packets arriving from the upstream data channel during traffic generation. The test instrument 100 controls the remote test instrument 104 according to the remote traffic generator protocol, a set of commands developed specifically for the application to allow efficient communication of MIN, MAX, STEP, along with synchronizing the starting time of the traffic generation.

The UDP (user datagram protocol) is used to ensure that the communications between the test instrument 100 and remote test instrument 104 are full duplex, with no automatic acknowledgments traveling back and forth, to ensure integrity of the throughput test. Because the communications between the test instrument 100 and remote test instrument 104 are conducted according to the UDP, there is no automatic acknowledgment of receipt as is available in TCP. Therefore, acknowledgments and replies are explicitly implemented in the communications to ensure that the instruments stay synchronized and are in communication during the traffic generation portion of the throughput test.

In step 212 labeled ACKNOWLEDGED BY REMOTE TEST INSTRUMENT?, the test instrument waits for an acknowledgment by the remote test instrument 104 that the traffic generation request was received.

In FIG. 3B, step 214 labeled SIMULTANEOUSLY GENERATE UPSTREAM AND DOWNSTREAM DATA TRAFFIC, the test instrument 100 and remote test instrument 104 simultaneously generate upstream and downstream data traffic at the selected data rates, with each test instrument counting the number of packets received from the other, for a predetermined period of time.

In step 216 labeled REQUEST FRAME COUNTS FROM REMOTE TEST INSTRUMENT, the test instrument 100, again according the remote traffic generator protocol commands, requests the frame count from the remote test instrument 104.

In step 218 labeled RESULTS RECEIVED?, the test instrument 100 waits for the reply from the remote test instrument 104 in response to the frame count request. If no response is received, the test instrument 100 may repeat step 216 or eventually terminate the throughput test because of lost communications.

In step 220 labeled FRAME COUNTS<THRESHOLD?, the test instrument 100 receives the frame count from the remote test instrument 104 and compares the frame count with the number of frames sent during the traffic generation sequence of step 214 for each of the downstream and upstream data paths. The threshold is defined to be the minimum acceptable ratio of frames received to frames sent and may be different for the upstream and downstream paths, depending on the application needs. In the present invention, the threshold for the downstream path determines the throughput rate and is typically 90% to 95% by industry convention. This threshold may be arrived at by reasonable experimentation or determined according to the application needs. The threshold for the upstream data path is used only to ensure the upstream link is functioning properly, since its data rate is set at a nominal expected value in order to stress the downstream data path.

If the percentage of frames received to frames sent falls below the threshold, the traffic generation phase of the throughput test is terminated, since the maximum supportable data rate has been determined to be the last downstream data sent before the present data rate.

In step 222 labeled DOWNSTREAM DATA RATE<MAX?, the traffic generation phase of the throughput test continues at increasingly higher data rates through the downstream data path as long as the threshold is exceeded up to the maximum data rate MAX that will be tested. If MAX has not yet been reached, in step 224 labeled INCREMENT DOWNSTREAM DATA RATE BY STEP, the downstream data rate is increased by an amount STEP defined by the user in step 202, and the traffic generation phase of the throughput test continues at step 210 with a higher downstream data rate.

As MAX is reached, the traffic generation phase of the throughput test is terminated, since the maximum supportable data has been determined to be at least MAX, which was defined by the user in step 202.

In step 226 labeled FORMAT AND DISPLAY RESULTS TO USER, the results of the throughput test are displayed in terms of the maximum supportable data rate downstream for a given upstream data rate.

Figure 4:
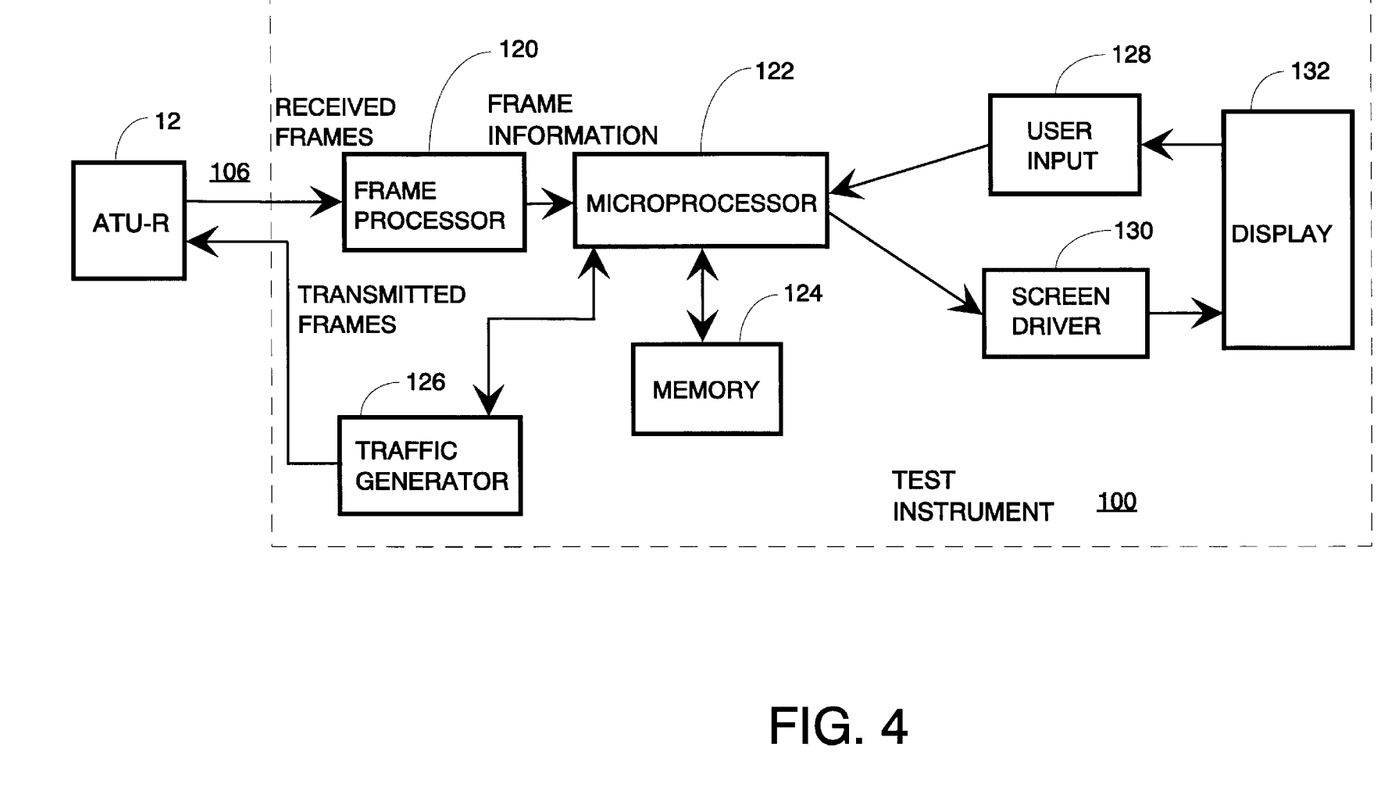
FIG. 4 is a simplified block diagram of the test instrument of FIG. 2.

In FIG. 4, there is shown a simplified block diagram of the test instrument 100 shown in FIG. 2. The test instrument 100 is connected to the ATU-R 12 via a 10BASE-T Ethernet connection in which IP data packets can be sent full duplex using TCP or UDP protocols. Received frames from the ATU-R 12 are coupled to a frame processor 120 which operates to extract information from the received frames, such as the frame count. The frame processor 120 is implemented as a dedicated hardware processor in the preferred embodiment to gain processing speed but may also be readily implemented in software according to performance requirements.

The frame processor 120 provides the frame information to a microprocessor 122 which stores the frame information in a memory 124. A traffic generator 126 coupled to the ATU-R 12 generates network traffic in the upstream direction through the ADSL circuit 102 at a duration and data rate specified by the microprocessor 122. A user input 128 accepts input from the instrument user, via keypresses or by touching a touchscreen display. A display 132 displays the results of the throughput test determined by the microprocessor 122 via a screen driver 130. The display 132 comprises a touchscreen display in the preferred embodiment which graphically displays the information and allows for user control via predetermined softkeys on the touchscreen display, which reduces the number of mechanical buttons and switches required on the front panel of the test instrument 100.

The remote test instrument 104 has substantially the same block diagram as that of test instrument 100 in the preferred embodiment and is connected to the central office end of the ADSL circuit 102. The roles of remote test instrument and test instrument are readily interchangeable, depending on which end of the ADSL circuit 102 the user resides. Alternatively, the remote test instrument 104 could be simplified to delete the user interface components including the user input 128, screen driver 130, and display 132, since the control of the remote test instrument 104 and user interface functions are performed by the test instrument 100.

The remote test instrument 104 is controlled by the test instrument 100 during the throughput test. Under remote control, the remote test instrument 104 receives the data traffic generated by the test instrument 100, obtains a frame count and simultaneously generates the downstream data traffic at a selected data rate and time interval. The frame count determined by the remote test instrument 104 is returned to the test instrument 100 via the ADSL circuit 102.

It will be obvious to those having ordinary skill in the art that many changes may be made in the details of the above described preferred embodiments of the invention without departing from the spirit of the invention in its broader aspects. For example, other types of digital subscriber lines, commonly described as the xDSL family, may also benefit from the automated, full duplex, variable data rate method for testing throughput according to the present invention. The ATU-R 12 and ATU-C 18 may be incorporated into the test instrument 100 and remote test instrument 104 in order to more directly characterize the twisted-pair telephone line in terms of the ATU modem adaptation required and also provide more control over the types of error detection and correction incorporated into the ADSL circuit 102. Other network and link level protocols, including 100BASE-T for example, may be readily substituted for the 10BASE-T lines that couple the ATU-R 12 and ATU-C 18 to other portions of the network. Therefore, the scope of the present invention should be determined by the following claims.

What we claim as our invention is:

1. A method for testing an asymmetric digital subscriber line, comprising:

(a) coupling a test instrument to a first end of said asymmetric digital subscriber line;

(b) coupling a remote test instrument to a second end of said asymmetric digital subscriber line;

(c) establishing communications between said test instrument and said remote test instrument;

(d) simultaneously generating traffic in both directions through said asymmetric digital subscriber line, said test instrument generating traffic in a first direction for a first number of frames and said remote test instrument generating traffic in a second direction for a second number of frames;

wherein said remote test instrument counts the number of frames received from said test instrument to produce a first frame count, and said test instrument counts the number of frames received from said remote test instrument to produce a second frame count;

(e) calculating throughput results by comparing said first frame count with said first number of frames and said second frame count with said second number of frames to determine the percentage of frames passing in both directions through said asymmetric digital subscriber line; and (f) displaying said throughput results on a display of said test instrument.

2. A method for testing an asymmetric digital subscriber line according to claim 1 further comprising displaying said throughput results for said first direction based on said first frame count and said first number of frames and for said second direction based on said second frame count and said second number of frames.

3. A method for testing an asymmetric digital subscriber line according to claim 1 wherein said first end is located at a customer premises and said second end is located at a central office.

4. A method for testing an asymmetric digital subscriber line according to claim 1 further comprising:

(a) incrementing a data rate of said traffic in said second direction until a ratio of said second frame count to said second number of frames is less than a threshold value; and (b) obtaining a maximum available throughput rate based on said data rate of said traffic in said second direction.

5. A method for testing an asymmetric digital subscriber line according to claim 1 wherein said test instrument and said remote test instrument communicate in fall duplex according to a user datagram protocol.

6. A method for testing an asymmetric digital subscriber line according to claim 1 wherein said test instrument controls said remote test instrument according to a remote traffic generator protocol.

* * * * *